(12) United States Patent
Columpsi

(10) Patent No.: US 9,309,878 B2
(45) Date of Patent: Apr. 12, 2016

(54) POPPET VALVE FOR A COMPRESSOR

(71) Applicant: BURCKHARDT COMPRESSION AG, Winterthur (CH)

(72) Inventor: Michele Columpsi, Guntershausen bei Aadorf (CH)

(73) Assignee: BURCKHARDT COMPRESSION AG, Winterthur (CH)

( * ) Notice: Subject to any disclaimer, the term of this patent is extended or adjusted under 35 U.S.C. 154(b) by 0 days.

(21) Appl. No.: 14/424,364

(22) PCT Filed: Sep. 2, 2013

(86) PCT No.: PCT/EP2013/068093
§ 371 (c)(1),
(2) Date: Feb. 26, 2015

(87) PCT Pub. No.: WO2014/033296
PCT Pub. Date: Mar. 6, 2014

(65) Prior Publication Data
US 2015/0204319 A1    Jul. 23, 2015

(30) Foreign Application Priority Data

Aug. 31, 2012 (EP) .................................... 12182691

(51) Int. Cl.
| F16K 15/08 | (2006.01) |
| F04B 39/10 | (2006.01) |
| F16K 15/02 | (2006.01) |
| F16K 27/02 | (2006.01) |

(52) U.S. Cl.
CPC ......... *F04B 39/1013* (2013.01); *F04B 39/1053* (2013.01); *F16K 15/026* (2013.01); *F16K 27/0209* (2013.01); *Y10T 137/7933* (2015.04)

(58) Field of Classification Search
CPC ................... Y10T 137/7839; Y10T 137/7859; Y10T 137/7861; Y10T 137/7862; F04B 39/1053
USPC ............ 137/512, 512.1, 516.11–516.23, 540, 137/543.17, 543.21
See application file for complete search history.

(56) References Cited

U.S. PATENT DOCUMENTS

| 2,125,137 A * | 7/1938 | Turnwald ............ F04B 39/1033 137/331 |
| 4,607,660 A | 8/1986 | Bennitt |
| 5,511,583 A | 4/1996 | Bassett |
| 2010/0090149 A1 | 4/2010 | Thompson et al. |

OTHER PUBLICATIONS

International Search Report for PCT/EP2013/068093, English translation attached to original, Both completed by the European Patent Office on Oct. 18, 2013, 5 Pages.

* cited by examiner

*Primary Examiner* — Kevin Lee
*Assistant Examiner* — P. Macade Nichols
(74) *Attorney, Agent, or Firm* — Brooks Kushman P.C.

(57) ABSTRACT

A poppet valve for a compressor, a piston compressor including such a poppet valve, and a repair kit for a poppet valve. The poppet valve has a cage, a valve seat and a plurality of closing elements, wherein the cage has a plurality of axial bores open towards the valve seat.

14 Claims, 5 Drawing Sheets

POPPET VALVE FOR A COMPRESSOR

CROSS-REFERENCE TO RELATED APPLICATION

This application is the U.S. national phase of PCT Application No. PCT/EP2013/068093 filed on Sep. 2, 2013, which claims priority to EP Patent Application No. 12182691.1 filed on Aug. 31, 2012, the disclosures of which are incorporated in their entirety by reference herein.

DESCRIPTION

The invention concerns a poppet valve for a compressor, a piston compressor comprising such a poppet valve, and a repair kit for a poppet valve.

BACKGROUND OF THE INVENTION

Publication US2010/0090149 discloses a poppet valve for a compressor. This poppet valve has a cage in which a plurality of bores is produced. A closing element is arranged in each of the bores. The closing element is mushroom-shaped and has a stem and a head, the diameter of which is greater than that of the stem. The stem is held in a bore of the cage and contains a cavity in which a spring is held. At its end opposite the cavity, the spring rests on a bottom element which is arranged on the base of the bore in the cage. The head of the closing element is configured such that in the closed state it closes a bore in the valve seat plate, wherein the valve seat plate is connected to the cage via a screw connection. In the pressureless state, the closing element is held by the spring such that the bore in the valve seat plate is closed.

The closing element opens when the pressure of the fluid, in particular the gas flowing into the bores in the valve seat plate in the poppet valve, exerts a force on the head of the closing element which exceeds the spring force of the spring. According to US2010/0090149, it is proposed to vary the thickness of the bottom element. As a result the preload of the spring is changed and consequently the pressure which leads to an opening of the closing element. If bottom elements of different thicknesses are used in the valve for otherwise identically configured closing elements and springs, the poppet valve may be used to regulate the fluid through-flow.

The poppet valve known from publication US2010/0090149 has the disadvantage that its function deteriorates after a certain operating duration, in particular when the valve is operated with a contaminated fluid, for example a gas which contains droplets or particles. This leads to an inhibition or blocking of the movement of the closing element, which has the consequence that the closing elements remain in the closed position or no longer close completely.

BRIEF SUMMARY OF INVENTION

The object of the invention is to configure a poppet valve which has more advantageous operating properties.

This object is achieved with a poppet valve having the features of claim 1. Subclaims 2 to 13 concern further advantageous embodiments of the invention. The object is furthermore achieved with a repair kit for a poppet valve having the features of claim 15.

The object is achieved in particular with a poppet valve comprising a cage, a valve seat and a plurality of closing elements, wherein the cage has a plurality of bores running in an axial direction, wherein the bores are open towards the valve seat and have a bottom element at an end opposite the valve seat, wherein a closing element which is moveable in the axial direction A is arranged in each bore, wherein the valve seat has a plurality of passage openings which are arranged opposite the bores in the axial direction A such that each of the passage openings can be closed by one of the closing elements, wherein a support element is arranged in each of the bores and wherein a spring is arranged between each support element and the respective closing element in order to apply a preload force directed towards the valve seat to the closing element, wherein the support element has at least one support element opening arranged eccentrically in relation to the bore, and wherein the bottom element has at least one bottom element opening arranged eccentrically in relation to the bore, in order to form a passage arranged eccentrically in relation to the bore in the axial direction A through the support element and the bottom element.

The poppet valve according to the invention has the advantage that this has a passage arranged eccentrically in relation to the bore through the support element and the bottom element, so that dirt particles which penetrate the bore or between the bore and the closing element may be discharged from the bore via the eccentrically arranged passage. In a particularly advantageous embodiment, the eccentrically arranged passage is arranged in the region of the wall of the bore, which gives the advantage that the movement of the closing element transports the dirt particles in the direction towards the passage, resulting in an automatic cleaning and discharge of the contaminants from the bore. The poppet valve disclosed in publication US2010/0090149 in contrast has the substantial disadvantage that the impact of closing element on the support element leads to compression of the contamination on the support element due to the impacting closing element, so that the contamination accumulates on the support element and even after a relatively short operating duration, the movement of the support element in the bore is restricted. A further disadvantage is that the closing elements wear prematurely.

The poppet valve according to the invention for a compressor comprises a cage, a valve seat and a plurality of closing elements. The valve seat has a plurality of passage openings, wherein each of the passage openings can be closed by one of the closing elements. The cage has a number of bores corresponding to the number of closing elements, wherein each closing element is received at least partially in the corresponding bore. A support element is arranged in each bore and the spring is arranged between the support element and the closing element. The bottom element and the support element each have an eccentrically arranged opening, so that with a corresponding mutual positioning and/or corresponding size, the two openings form a passage running through the bottom element and the support element. "Eccentrically" in this context means that the center axis opening is different from the longitudinal center axis of the bore, i.e. the center axis of the opening does not coincide with the longitudinal center axis of the bore. In particular, the center axis may be offset to the longitudinal center axis. In a particularly advantageous embodiment, the center axis and the longitudinal center axis are parallel to each other.

In an advantageous embodiment, the passage comprises an opening arranged eccentrically in the support element. The passage also comprises an opening arranged eccentrically in the bottom element. In particular, the opening in the support element may take at least one of the following forms: a concave curvature, a V-shaped slotted recess, a U-shaped slotted recess, or a circumferential recess which is obtained by a local reduction of the outer diameter of the support element. In a further advantageous embodiment, the support element may have an outer contour which at least in portions has a distance of at least 2 mm from the inner wall of the bore.

In a particularly advantageous embodiment, the bottom element and the support element are configured adapted to each other such that the passage is constantly open throughout. In a further advantageous embodiment, the bottom element and the support element are configured adapted to each other such that the passage is either open throughout or is closed partially or even completely, depending on the mutual positioning of the support element relative to the bottom element. In an advantageous embodiment, the support element is mounted moveably in the bore, in particular rotatably and/or displaceably in the direction of the bore. This movability of the support element in the bore may further support the discharge of contaminants from the bore. Because the passage changes depending on the mutual positioning of the support element relative to the bottom element, the passage is constantly cleaned of any deposited contaminants so that it is guaranteed that the passage does not become blocked even during long-term operation of the poppet valve.

In an advantageous embodiment, the support element has a guide element for the spring. This guide element may be formed as a protrusion which extends inside the spring. The spring thus surrounds the protrusion and is fixed in position by the protrusion.

The invention is now described in detail with reference to exemplary embodiments.

BRIEF DESCRIPTION OF THE DRAWINGS

The drawings used to explain the exemplary embodiments show.

In principle, the same parts carry the same reference numerals in the drawings.

MODE OF OPERATION OF INVENTION

Figure 1:
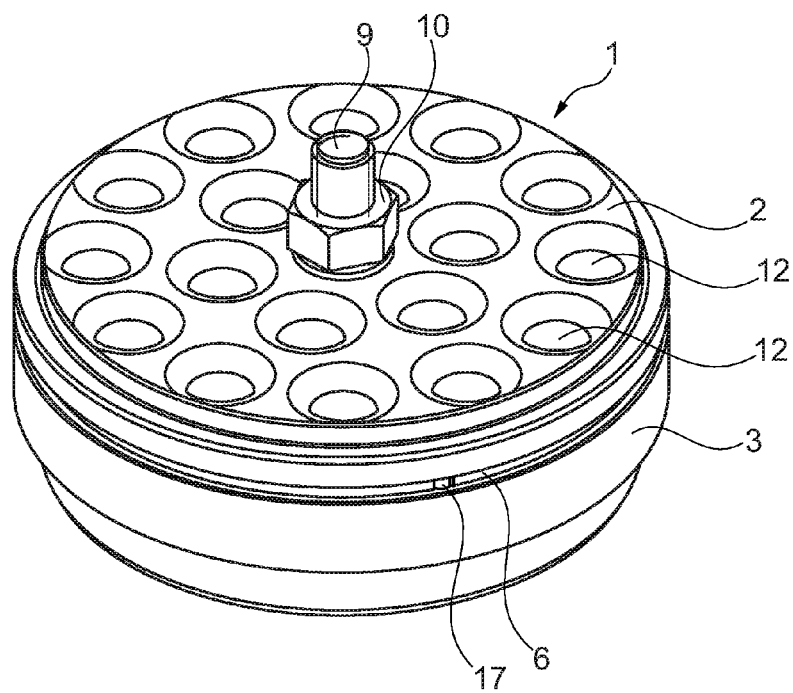
FIG. 1 a view of a poppet valve according to the invention.

FIG. 1 shows in a perspective view a poppet valve 1 in assembled state. The poppet valve 1 comprises a valve seat 2 and a cage 3. A wearing plate 6 is arranged between the valve seat 2 and the cage 3. The cage 3 is connected to the valve seat 2 via a screw bolt 9 with nut 10. The valve seat 2 has a plurality of passage openings 12. In the present exemplary embodiment, the valve seat 2 comprises eighteen passage openings 12. A valve seat 2 may also have a different number of passage openings 12 depending on diameter and requirements.

Figure 2:
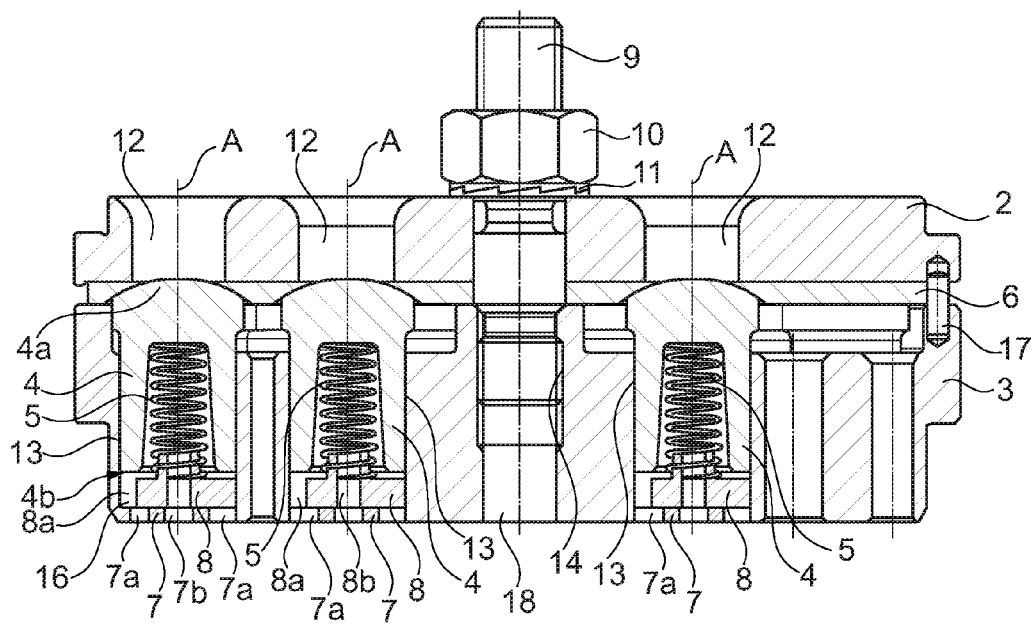
FIG. 2 a longitudinal section through the poppet valve in FIG. 1.

FIG. 2 shows a longitudinal section through the poppet valve 1 shown in FIG. 1. In the exemplary embodiment shown, the wearing plate 6 is arranged between the valve seat 2 and the cage 3. In a further exemplary embodiment (not shown), the wear plate 6 may also be omitted. The cage 3 is connected to the valve seat 2 via the screw bolt 9, nut 10 and washer 11. The screw bolt 9 is held in a centrally arranged bore 18 of the cage 3 with threaded bore 14. The screw bolt 9 has an external thread which engages with the corresponding threaded bore 14. A bolt 17 also prevents a mutual twisting of the valve seat 2 and cage 3.

The valve seat 2 has a plurality of passage openings 12. These passage openings 12 may be closed by closing elements 4. The wear plate 6 is arranged directly adjacent to the valve seat 2. The wear plate 6 also contains passage openings which, in assembled state, align with the passage openings 12 of the valve seat 2.

The cage 3 has a plurality of bores 13 running in the axial direction A, wherein the bores 13 are open towards the valve seat 2 and wherein, at an end opposite the valve seat 2, the bore 13 ends in a bottom element 7. A closing element 4 which is moveable in the axial direction A is arranged in each bore 13, wherein the valve seat 2 has a plurality of passage openings 12 which are arranged opposite the bores 13 in the axial direction A, such that each of the passage openings 12 can be closed by one of the closing elements 4. A support element 8 is arranged in each bore 13 and lies on the bottom element 7, wherein a spring 5 is arranged between each support element 8 and the respective closing element 4 in order to apply a preload force directed towards the valve seat 2 to the closing element 4. The support element 8 has at least one support element opening 8a arranged eccentrically in relation to the bore 13 or axis A. Also the bottom element 7 has at least one bottom element opening 7a arranged eccentrically in relation to the bore 13, in order to form a passage 16 arranged eccentrically in relation to bore 13 or axis A in the axial direction A through the support element 8 and the bottom element 7.

The closing element 4 is mounted displaceably inside the bore 13 in the direction of axis A. The eccentrically arranged passage 16 has the advantage that contaminants located in the gap between the bore 13 and the closing element 4 are actively transported downward or expelled through the passage 16 by the lower shoulder 4b of the closing element 4, so that any contaminants and dirt are discharged downward out of the poppet valve 1 via the passage 16. The passage 16 therefore has the advantage that the poppet valve 1 can clean itself automatically, and that any accumulation or deposit of dirt within the bores 13 is substantially reduced or even prevented completely. This gives the advantage that the poppet valve 1 according to the invention can be operated without maintenance preferably during a long time period, for example several thousand operating hours.

Figure 3:
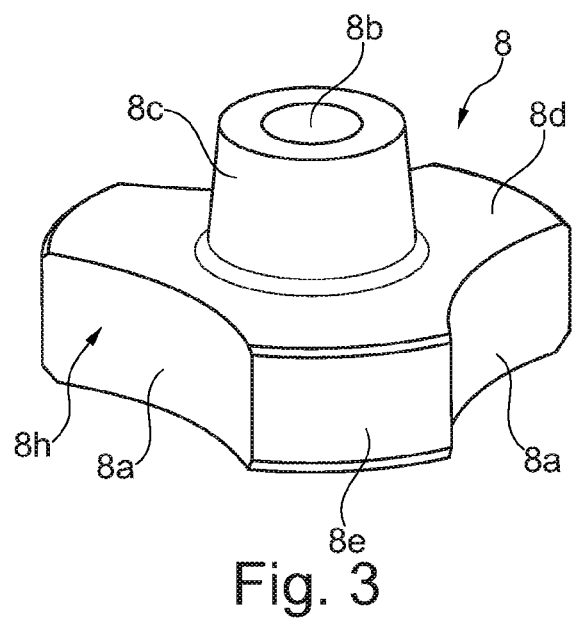
FIG. 3 a view of a support element.
Figure 4:
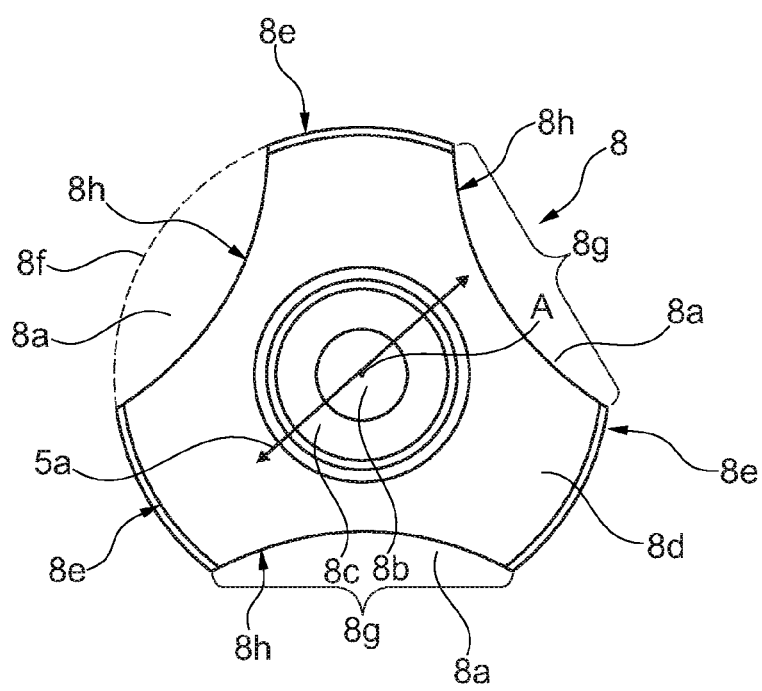
FIG. 4 a top view of the support element in FIG. 3.
Figure 7:
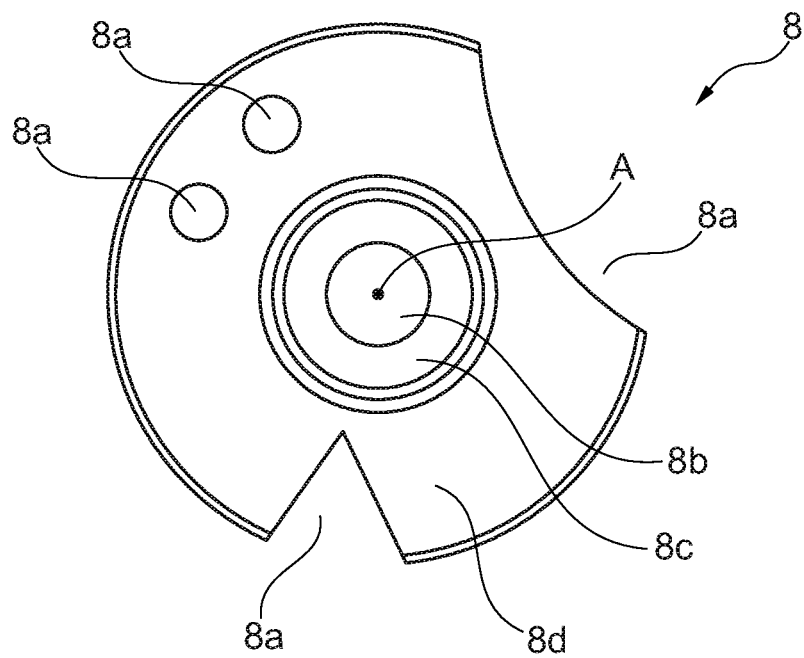
FIG. 7 a top view of an exemplary embodiment of support elements.

FIG. 3 shows the support element 8 depicted in FIG. 2 in perspective view. The support element 8 comprises a base body 8d with a circular outer peripheral face 8e, wherein the base body 8d has at least one portion 8g in the peripheral direction along which the base body 8d has a reduced diameter in order to form the support element opening 8a along the portion 8g. The reduced diameter is preferably reduced by at least 2 mm. In the exemplary embodiment shown, the side face 8h of the support element 8 which forms the eccentrically arranged opening 8a is formed concave. There are a multiplicity of possible embodiments for the form of the side face 8h, in order to form an opening 8a between the side face 8h and the inner wall of the bore 13. In an advantageous embodiment, in the peripheral direction, the support element 8 as shown in FIG. 4 has a plurality of side faces 8h with reduced diameter in order to form a plurality of openings 8a in the peripheral direction. In the exemplary embodiment shown, three openings 8a are formed. In an advantageous embodiment, the base body 8d has a concave form along portion 8g in the peripheral direction. In a further advantageous embodiment, the base body 8d as shown in FIG. 7 has at least one orifice 8a which forms the support element opening 8a. In a further advantageous embodiment, the support element 8 has a plurality of support element openings 8a spaced apart in the peripheral direction. In an advantageous embodiment, the support element 8 has a guide element 8c for the spring 5. Advantageously the support element 8, as shown in FIG. 2, may have a continuous central bore 8b. In an advantageous embodiment, the spring 5 running in the axial direction A has an outer diameter 5a, wherein the support element openings 8a are arranged outside this outer diameter 5a, as shown in FIG. 4.

Figure 5:
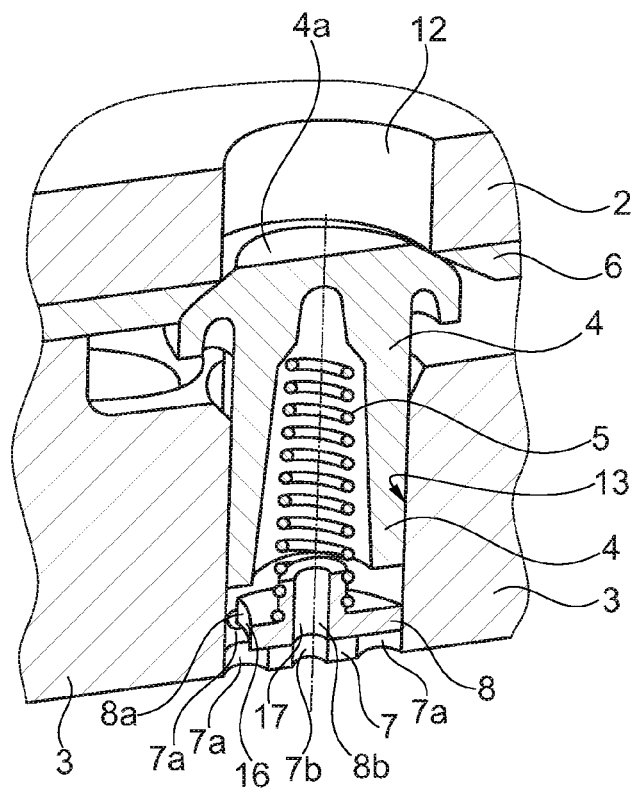
FIG. 5 a detailed view of a poppet valve.
Figure 6:
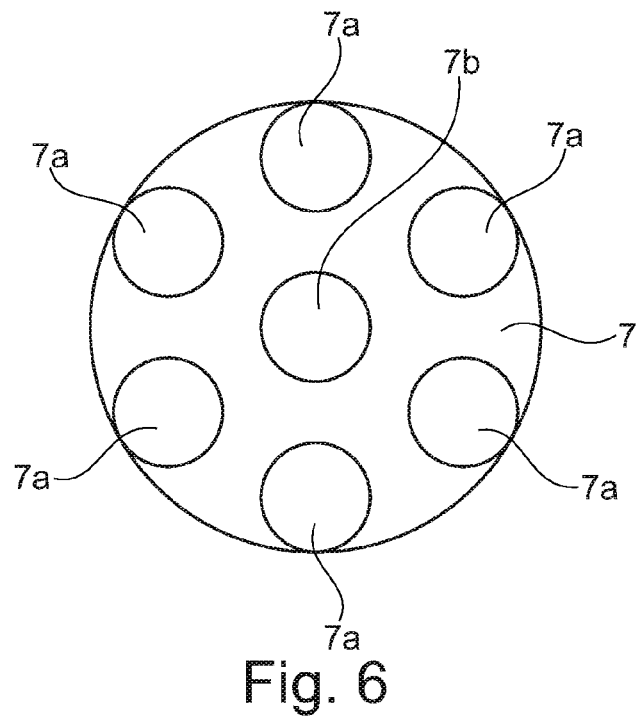
FIG. 6 a top view of a bottom element.

FIG. 5 shows in detail a cage 3 with bore 13 and closing element 4 arranged therein. The support element 8 lies on the bottom element 7, wherein the support element 8 and bottom element 7 are arranged mutually such that a passage 16 is formed by the openings 8a, 7a arranged successively in the direction of axis A. FIG. 6 shows a top view of the bottom element 7 shown in FIG. 5, wherein the bottom element has a plurality of eccentrically arranged openings 7a in the peripheral direction. Also the bottom element 7 may have a centrally arranged opening 7b. In an advantageous embodiment, the support element 8 has a central bore 8b and the bottom element 7 has a centrally arranged opening 7b to form an additional passage 17 in the center. The support element 8 used in FIG. 5 is configured as shown in FIGS. 3 and 4, so that in the arrangement shown in FIG. 5, three passages 16 are formed which are arranged distributed in the peripheral direction. In an advantageous embodiment, the support element 8 is arranged moveably in the bore 13 so that this is mounted rotatably and/or displaceably in the axial direction A in the bore 13. This rotation and/or displacement exerts an additional cleaning effect and helps discharge any contaminants out of the bore 13.

FIG. 7 shows in a top view a support element 8 with three different embodiments of eccentrically arranged openings 8a. The opening 8a arranged on the right corresponds to the opening 8a shown in FIG. 4 and was already described in detail in connection with FIG. 4. The opening 8a, as shown at the top left in FIG. 7, may also be formed as an orifice or bore. One or more such orifices may be arranged distributed in the peripheral direction. The openings may have a plurality of possible configurations, such that they are arranged eccentrically in relation to the center axis A of the support element 8. FIG. 7 shows at the bottom a further exemplary opening 8a which is configured as a slot or in a V-shape.

The bottom element 7 shown in FIG. 6 must have at least one eccentrically arranged opening 7a. The at least one opening 7a may have a plurality of configurations, and for example it may also have the forms of the openings 8a shown in FIG. 7. The sole important factor is that the eccentrically arranged openings 7a, 8a are arranged adapted to each other such that they can form a common passage 16. In an advantageous embodiment, the support element 8 is mounted rotatably in the bore 13. In an advantageous embodiment, the eccentrically arranged openings 7a, 8a are configured adapted to each other such that a passage 16 is formed which is open at least during certain time intervals and preferably continuously.

Figure 8:
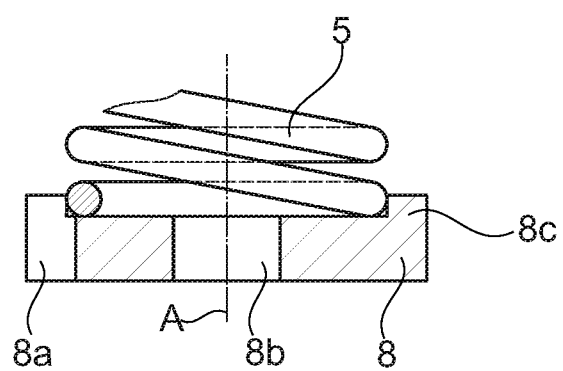
FIG. 8 a side view of a further exemplary embodiment of a support element.

The support elements 8 have a plurality of configurations to fulfil the function of holding the spring 5 in a central position and also comprising an eccentrically arranged opening 8a. FIG. 8 shows a further exemplary embodiment of such a support element 8 with a circular guide element 8c, within which the spring 5 rests on the support element 8 and is centered. The support element 8 also has at least one eccentrically arranged opening 8a, one possible configuration of which is shown as an example. The support element 8 may however also be configured as a disc without a guide element 8c.

In an advantageous embodiment, the support element 8 has a play relative to the wall of the bore 13 so that the support element 8 can execute an oscillation movement radially to the bore 13.

In an advantageous embodiment, a repair kit is provided for the poppet valve 1, wherein the repair kit comprises at least one closing element 4 and at least one support element 8 with an eccentrically arranged support element opening 8a. Usually, the closing elements 4 and the support elements 8 are subject to wear during operation of the poppet valve 1, so that they must be replaced after a certain operating time. It may prove advantageous if the repair kit also comprises at least one spring 5.

With the poppet valve according to the invention, any dirt present is advantageously removed together with a bypass fluid flowing between the wall of the bore 13 and the closing element 4. An accumulation of dirt deposits in the region of the support element 8 and/or the bottom element 7 is prevented, so that advantageously continuous operation of the poppet valve is possible over a period of for example several thousand operating hours.

Evidently the bottom elements 7 and/or support elements 8 of the individual exemplary embodiments may be combined in arbitrary fashion. In particular, a bottom element 7 or a support element 8 may also have several eccentrically arranged passages 7a, 8a of different configurations. The poppet valve 1 as shown in FIG. 2 comprises a plurality of bottom elements 7 and support elements 8. It is possible to provide at least some of the bottom elements 7 and/or support elements 8 with eccentrically arranged passages 7a, 8a of different configurations.

Figure 9:
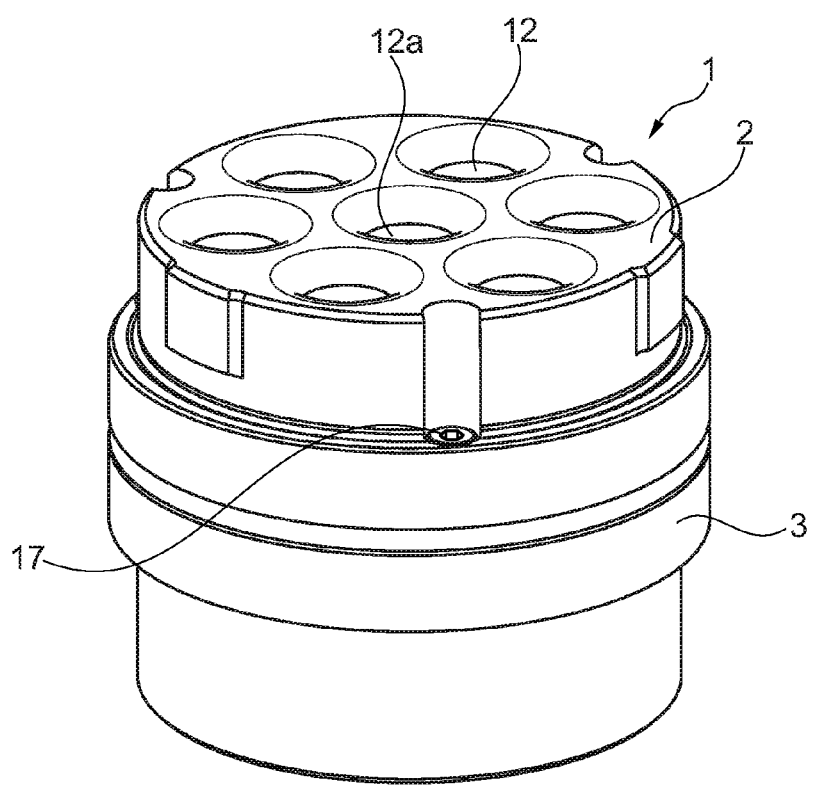
FIG. 9 a perspective view of a further exemplary embodiment of a poppet valve.

In a further embodiment shown in FIG. 9, the poppet valve 1 shown in FIGS. 1 and 2 could also be configured without the screw bolt 9, nut 10, washer 11 and threaded bore 14, in that the valve seat 2 and the cage 3 are connected together via for example a plurality of fixing means 17, such as screws, arranged distributed in the peripheral direction. With such a configuration as shown in FIG. 9, it has proved advantageous also to arrange a closing element 4 in the center. FIG. 9 shows in the center a passage opening 12a below which—as shown in FIG. 2—a moveable closing element 4, a bottom element 7 with bottom element opening 7a, and a support element 8 with spring 5 are provided, so that the poppet valve 1 shown in FIG. 9 also has a passage opening 12a in the center which can be closed by the closing element 4. The passage opening 12a and the bore 13 arranged below this, and the closing element 4 mounted displaceably therein with spring 5, are preferably configured identically to the passage opening 12 with bore 13, closing element 4 and spring 5 shown in FIG. 2. Also the poppet valve 1 shown in FIGS. 1 and 2 could be configured such that, instead of the screw bolt 9, this has a passage opening 12 arranged in the center. In comparison with the embodiment shown FIGS. 1 and 2, such an embodiment has the advantage that it has a greater number of passage openings 12, 12a and hence allows a greater flow rate.

The invention claimed is:

1. A poppet valve for a compressor, comprising a cage, a valve seat and a plurality of closing elements, wherein the cage has a plurality of bores running in an axial direction, wherein the bores are open towards the valve seat and have a bottom element at an end opposite the valve seat, wherein a closing element which is moveable in the axial direction is arranged in each bore, wherein the valve seat has a plurality of passage openings which are arranged opposite the bores in the axial direction such that each of the passage openings can be closed by one of the closing elements, wherein a support element is arranged in each of the bores and wherein a spring is arranged between each support element and the respective closing element in order to apply a preload force directed towards the valve seat to the closing element, wherein the support element has at least one support element opening arranged eccentrically in relation to the bore, and that the bottom element has at least one bottom element opening arranged eccentrically in relation to the bore, in order to form a passage arranged eccentrically in relation to the bore in the axial direction through the support element and the bottom element.

2. The poppet valve as claimed in claim 1, wherein the support element opening is configured such that the support element has a base body which lies on the bottom element, and that the base body has at least one portion in a peripheral direction along which the base body has a reduced diameter in order to form the support element opening along the portion.

3. The poppet valve as claimed in claim 2, wherein the base body has a concave form along the portion in the peripheral direction.

4. The poppet valve as claimed in claim 1, wherein the support element has a base body, and that the base body has at least one orifice which forms the support element opening.

5. The poppet valve as claimed in claim 1, wherein a plurality of support element openings is arranged spaced apart in a peripheral direction of the support element.

6. The poppet valve as claimed in claim 1, wherein an spring running in the axial direction has an outer diameter, and that the support element openings are arranged outside this outer diameter.

7. The poppet valve as claimed in claim 1, wherein the bottom element has a plurality of bottom element openings arranged spaced apart in a peripheral direction of the bottom element.

8. The poppet valve as claimed in claim 7, wherein the bottom element openings are configured as bores.

9. The poppet valve as claimed in claim 1, wherein the support element is rotatably mounted in the bore, rotatably and displaceably in the axial direction.

10. The poppet valve as claimed in claim 1, wherein the at least one bottom element opening and the at least one support element opening are configured to each other, such that in every possible position of the support element relative to the bottom element, an open passage is formed through the support element and the bottom element.

11. The poppet valve as claimed in claim 1, wherein the support element has a play relative to a wall of the bore such that the support element can execute an oscillation movement radially to the axial direction.

12. The poppet valve as claimed in claim 1, wherein the support element is mounted rotatably about its longitudinal axis.

13. The poppet valve as claimed in claim 1, wherein the support element has a guide element for the spring.

14. A piston compressor comprising a poppet valve as claimed in claim 1.

* * * * *

UNITED STATES PATENT AND TRADEMARK OFFICE
CERTIFICATE OF CORRECTION

| | | |
|---|---|---|
| PATENT NO. | : 9,309,878 B2 | Page 1 of 1 |
| APPLICATION NO. | : 14/424364 | |
| DATED | : April 12, 2016 | |
| INVENTOR(S) | : Columpsi et al. | |

It is certified that error appears in the above-identified patent and that said Letters Patent is hereby corrected as shown below:

In the claims

Column 7, Line 26, Claim 6

After "as claimed in claim 1, wherein"
Delete "an" and
Insert -- a --.

Signed and Sealed this
Fifth Day of July, 2016

Michelle K. Lee
*Director of the United States Patent and Trademark Office*